United States Patent [19]

Okada et al.

[11] Patent Number: 4,584,793
[45] Date of Patent: Apr. 29, 1986

[54] DOOR GLASS WEATHER STRIP IN MOTOR VEHICLES

[75] Inventors: Hachiro Okada; Kenzi Ono, both of Toyota, Japan

[73] Assignee: Toyota Jidosha Kabushiki Kaisha, Japan

[21] Appl. No.: 717,687

[22] Filed: Mar. 29, 1985

[30] Foreign Application Priority Data

Apr. 3, 1984 [JP] Japan ............................ 59-48958[U]

[51] Int. Cl.⁴ ............................................. E06B 7/16
[52] U.S. Cl. ........................................ 49/488; 49/495
[58] Field of Search ......................... 49/485, 488, 495; 296/146

[56] References Cited

U.S. PATENT DOCUMENTS 2,737,412  3/1956  Smith et al. ............................ 49/493
3,164,870  1/1965  Harms et al. ........................... 49/495
4,455,785  6/1984  Wahr et al. ............................ 49/488

FOREIGN PATENT DOCUMENTS 47-24116   Japan.
48-29613   Japan.
55-13015   Japan.
57-197854  Japan.
57-81820   Japan.
57-214411  Japan.

Primary Examiner—Kenneth Downey
Attorney, Agent, or Firm—Finnegan, Henderson, Farabow, Garrett & Dunner

[57] ABSTRACT

A door glass weather strip in a motor vehicle comprising a main body of door glass weather strip held by a door frame, a top end seal portion continuously, integrally formed on the main body of door glass weather strip to be clamped between the upper end edge of a door glass and the door frame when the door glass is fully closed and an outer lip formed on the top end seal portion in a manner to be continuously extending to the outside of the vehicle and to come into contact with the outer surface of the upper end edge of the door glass when the door glass is fully closed, wherein:

the top end seal portion and the outer lip are formed to provide a member being of a generally L-shape in cross section, which can integrally rock about the outer end portion of the main body of door glass weather strip on the outer side of the vehicle in a direction of the thickness of the door glass; and a hook-shaped block is formed at the end portion of the top end seal portion on the side of a compartment, to be engaged with a recess formed in the main body of door glass weather strip in a manner to control a displacement of the top end seal portion outwardly in the direction of the thickness of the door glass.

14 Claims, 2 Drawing Figures

DOOR GLASS WEATHER STRIP IN MOTOR VEHICLES

BACKGROUND OF THE INVENTION

1. Field of the Invention

This invention relates to improvements in a door glass weather strip for sealing a space between a door and a door frame when a door glass is closed in a side door or the like in a motor vehicle.

2. Description of the Prior Art

For the purpose of reducing an air resistance and a so-called wind whistle during running of a motor vehicle at high speed, there has been proposed a so-called flush-surfaced motor vehicle, wherein the outer surface of the vehicle body including door glasses and door frames is flushed up.

Here, during running of the motor vehicle at high speed, a door glass is subjected to a force of expanding the door glass outwardly due to a difference in pressure between the interior and the exterior of a compartment, and, when this outward displacement cannot be controlled, the wind whistle and air resistance increase.

As a means for controlling the outward displacement of the door glass with the demand for the flush-surface being satisfied, as described in Japanese Utility Model Laid-Open No. 13015/81 for example, there has been made such a proposal that a clip being of a generally L-shape in cross section, for receiving the upper end edge of the door glass when the door glass is fully closed, is secured to the door frame.

If this is the case, an outward displacement of the door glass can be reliably controlled only by the projection of the clip in the direction of the thickness of the door glass, however, during the closing of the door glass, in some cases the top end of the door glass should not necessarily be received in the clip. In such cases, the disadvantage of incomplete sealing is presented.

In contrast thereto, as previously proposed in Japanese Utility Model Appln. No. 197854/83 filed on Dec. 22, 1983 by the present applicant (Refer to FIG. 2), it may be proposed that an outer lip 3 to come into contact with the outer surface of the upper end edge 2A of a door glass 2 when the door glass 2 is fully closed is integrally formed on a door glass weather strip 1.

In this case, the outer lip 3 is identical in material quality with the door glass weather strip 1, and normally formed of flexible rubber or the like.

When the top end of the door glass 2 is displaced outwardly due to the difference in pressure between the interior and the exterior of a compartment 4, the outer lip 3 in this case, while resisting to the outward displacement, is distorted outwardly together with the upper end edge 2A of the door glass 2 to absorb the displacement of the door glass 2.

In FIG. 2, designated at 5 is a door frame, 6 a roofside rail, 7 a roof and 8 a door weather strip, respectively.

Similar constructions of door glass weather strip are disclosed in U.S. Pat. No. 2,737,412, Japanese Utility Model Kokai (Laid-Open) Nos. 24116/73 and 29613/74 and Japanese Patent Kokai (Laid-Open) Nos. 81820/83 and 214411/83.

In the above-decribed door construction, in order to satisfactorily absorb the outward displacement of the upper end edge 2A of the door glass 2, the width of the outer lip 3 in a direction along the outer surface of the door glass 2 should be increased. For this reason, the aesthetic appearance of the vehicle is deteriorated and the outer lip 3 as being a portion to be distorted by the upper end edge of the door glass during the opening or closing of the door glass is increased in its width, thus tending to present the disadvantage of incomplete sealing due to deterioration with age.

If the width of the outer lip 3 is reduced, then the disadvantage of the deterioration with age and the deterioration in the aesthetic appearance of the vehicle can be obviated to some extent. However, it becomes impossible to satisfactorily absorb the outward displacement of the door glass 2, thus presenting incomplete sealing under the full closing of the door glass 2 during running of the motor vehicle at high speed.

SUMMARY OF THE INVENTION

It is therefore the primary object of the present invention is to provide a door glass weather strip in a motor vehicle, capable of absorbing and controlling an outward displacement of a door glass without using a clip and the like and without increasing the width of an outer lip.

To this end, the present invention contemplates that, in a door glass weather strip in a motor vehicle comprising a main body of door glass weather strip held by a door frame, a top end seal portion continuously, integrally formed on the main body of door glass weather strip to be clamped between the upper end edge of a door glass and the door frame when the door glass is fully closed and an outer lip formed on the top end seal portion in a manner to be continuously extending to the outside of the vehicle and to come into contact with the outer surface of the upper end edge of the door glass when the door glass is fully closed, the top end seal portion and the outer lip are formed to provide a member being of a generally L-shape in cross section, which can integrally rock about the end portion of the door glass weather strip on the outer side of the vehicle in a direction of the thickness of the door glass, and a hook-shaped block is formed at the end portion of the top end seal portion on the side of a compartment, to be engaged with a recess formed in the main body of door glass weather strip in a manner to control a displacement of the top end seal portion outwardly in the direction of the thickness of the door glass, whereby, when the door glass is fully closed, if the top seal portion is pushed upwardly by the upper end edge of the door glass, then the outer lip integrally formed on this top end seal portion is subjected to a force of bringing the outer lip into pressing contact with the outer surface of the top end of the door glass through the action of the top end seal portion, whereby the upper end edge of the door glass is urged in a direction of a compartment and further the hook-shaped block at the forward end of the top end seal portion is engaged with the recess of the door glass weather strip, so that the outward displacement of the top end of the door glass can be controlled to maintain the sealing.

To the above end, the present invention contemplates that the top end seal portion is in parallel to a connecting portion extending from the main body of door glass weather strip to the end portion thereof on the outer side of the vehicle along the undersurface of the door frame and opposed to the same in a free condition through a space, and the inner end portion of the top end seal portion on the side of the compartment is connected to the forward end of a positioning bridge, which is projected from the main body of door glass weather strip, whereby outward displacements of the top end seal portion and outer lip can be controlled and be brought into contact with the upper end edge of the door glass at predetermined positions.

To the above end, the present invention contemplates that the top end seal portion is in parallel to a connecting portion extending from the main body of door glass weather strip to the end portion thereof on the outer side of the vehicle along the undersurface of the door frame and opposed to the same in a free condition through a space, and a foam plastic material very high in deformation value and flexible is filled in the portion of the space.

To the above end, the present invention contemplates that the top end seal portion is in parallel to a connecting portion extending from the main body of door glass weather strip to the end portion thereof on the outer side of the vehicle along the undersurface of the door frame and opposed to the same in a free condition through a space, and the forward end of the hook-shaped block is connected to the forward end of a positioning bridge, which is projected from the main body of door glass weather strip.

To the above end, the present invention contemplates that the recess is faced to the hook-shaped block, and the hook-shaped block is formed to be entered the recess when the top end seal portion is pushed up by the upper end edge of the door glass.

To the above end, the present invention contemplates that an outer corner portion of the upper end edge of the door glass is chamfered to form a inclined surface directed upwardly and outwardly.

DETAILED DESCRIPTION OF THE PREFERRED EMBODIMENT

Figure 1:
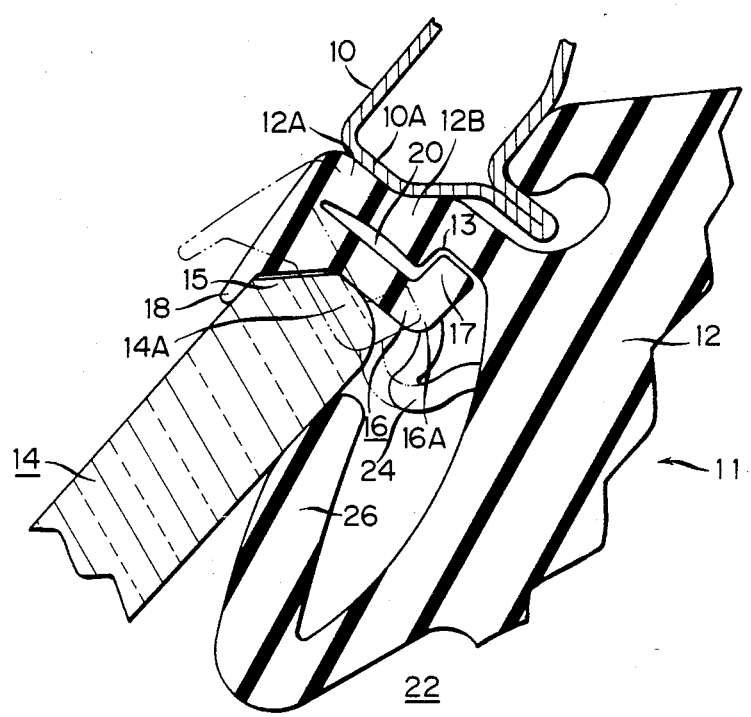
FIG. 1 is a sectional view showing one embodiment of the door glass weather strip in a motor vehicle according to the present invention.
Figure 2:
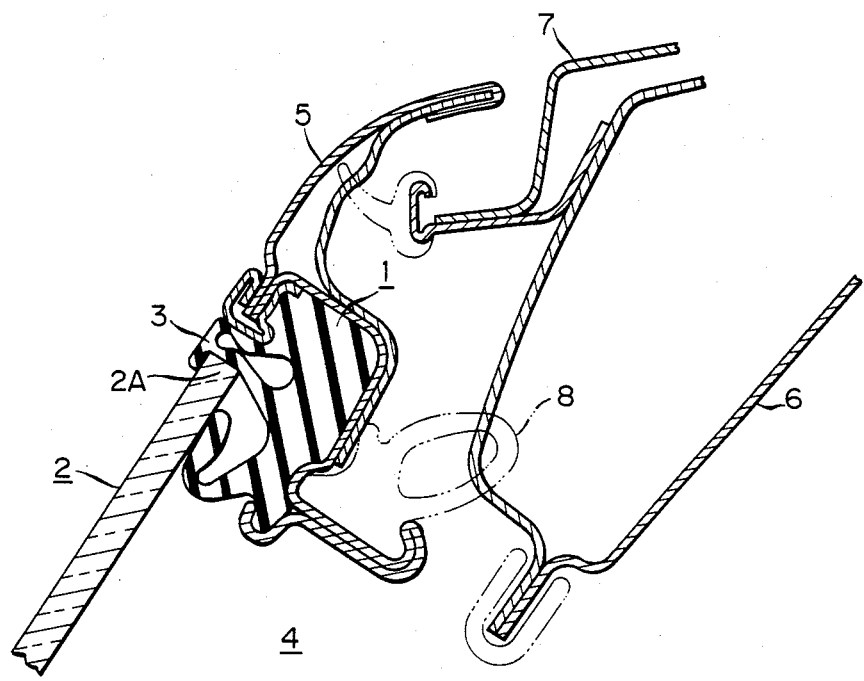
FIG. 2 is sectional view similar to FIG. 1, showing the construction of the door glass weather strip in the prior application filed by the present applicant.

Description will hereunder be given of one embodiment of the present invention with reference to the drawings.

As shown in the drawings, according to this embodiment, in a door glass weather strip 11 in a motor vehicle comprising a main body 12 of door glass weather strip held by a door frame 10, a top end seal portion 16 continuously, integrally formed on the main body 12 of door glass weather strip to be clamped between the upper end edge 14A of a door glass 14 and the door frame 10 when the door glass 14 is fully closed and an outer lip 18 formed on the top end seal portion 16 in a manner to be continuously extending to the outside of the vehicle and to come into contact with the outer surface of the upper end edge 14A of the door glass 14 when the door glass 14 is fully closed, the top end seal portion 16 and the outer lip 18 are formed to provide a member being of a generally L-shape in cross section, which can integrally rock about the outer end portion 12A of the main body 12 of door glass weather strip on the outer side of the vehicle in a direction of the thickness of the door glass 14, and a hook-shaped block 17 is formed at the end portion of the top end seal portion 16 on the side of a compartment 22, to be engaged with a recess 13 in the main body 12 of door glass weather strip in a manner to control a displacement of the top end seal portion 16 outwardly in the direction of the thickness of the door glass 14.

The top end seal portion 16 is in parallel to a connecting portion 12B extending from the main body 12 of door glass weather strip to the end portion 12A thereof on the outer side of the vehicle along the undersurface 10A of the door frame 10 and opposed to the same in a free condition through a space 20.

Furthermore, the inner end portion 16A of the top end seal portion 16 on the side of the compartment 22 is connected to the forward end of a positioning bridge 24, which is projected from the main body 12 of door glass weather strip, whereby outward displacements of the top end seal portion 16 and outer lip 18 can be controlled and be brought into contact with the upper end edge 14A of the door glass 14 at predetermined positions.

Here, the outer surface portion of the upper end edge 14A of the door glass 14 is chamfered to form an inclined surface directed outwardly and upwardly.

In the drawing, designated at 26 is an inner lip to come into contact with the inner surface of the upper end edge 14A of the door glass 14 to seal when the door glass 14 is fully closed.

Description will now be given of action of the above embodiment.

When the door glass 14 is separated from the door glass weather strip 11 and opened to some extent or more, as indicated by two-dot chain lines in the drawing, the top end seal portion 16 and the outer lip 18 take positions displaced to the outside of the vehicle through the elasticities thereof.

At this time, a displacement to the outside of the vehicle of the top end seal portion 16 is controlled by the positioning bridge 24, and the top end seal portion 16 is at a position meeting a moving path of the upper end edge 14A of the door glass 14.

When the door glass 14 is closed, firstly, the upper end edge 14A of the door glass 14 comes into contact with the inner lip 26 to distort it as indicated by solid lines in the drawing.

Subsequently, the upper end edge 14A comes into contact with and pushes up the top end seal portion 16.

Since this top end seal portion 16 together with the outer lip 18 can integrally rock about the end portion 12A on the outer side of the vehicle in the direction of the thickness of the door glass, the top end seal portion 16 is displaced in a direction indicated by solid lines in the drawing.

In consequence, similarly, the outer lip 18 is displaced to the side of the compartment 22 as indicated by solid lines to be brought into pressing contact with the outer surface of the upper end edge 14A.

At this time, the positioning bridge 24 is upwardly flexed as indicated by solid lines in the drawing to permit a displacement of the top end seal portion 16.

Furthermore, when the top end seal portion 16 is pushed up to a position indicated by solid lines in the drawing by the upper end edge 14A of the door glass 14, the hook-shaped block 17 at the forward end of the top end seal portion 16 enters the recess 13 formed in the main body 12 of door glass weather strip.

The relationship between the recess 13 and the hook-shaped block 17 is determined such that the hook-shaped block 17 is engaged with the recess 13 in a manner to be controlled in its displacement in a direction to the outside of the compartment.

In consequence, the outer lip 18 is previously subjected to a force in a direction of inwardly urging the upper end edge 14A of the door glass 14 under a predetermined value of pressure, whereby, when the upper end edge 14A of the door glass 14 is subjected to a force of outwardly displacing the upper end edge 14A due to a difference in pressure between the interior and the exterior of the compartment, the outer lip 18, while being distorted to some extent, can control an outward displacement of the upper end edge 14A and absorb the displacement.

Further, as described above, since the top end seal portion 16 is engaged with the recess 13 formed in the main body 12 of door glass weather strip through the hook-shaped block 17 at the forward end thereof, a displacement of the top end seal portion 16 to the outside of the compartment is controlled. In consequence, even when the upper end edge 14A of the door glass 14 is subjected to a force in the direction to the outside of the compartment, the top end seal portion 16 can resist this force to some extent to control the position of the upper end edge 14A, and, as a reaction force to the aforesaid force, the outer lip 18 can be brought into pressing contact with the outer surface of the upper end edge 14A to form a seal.

In consequence, there is no need of increasing the width of the outer lip 18.

Here, an outer corner portion of the upper end edge 14A of the door glass 14 is chamfered to form the inclined surface 15 directed upwardly and outwardly, whereby the upper end edge 14A satisfactorily bites into the top end seal portion 16, and the upper end edge 14A can keep good contact with the top end seal portion 16 and the outer lip 18. Further, the top end seal portion 16 can avoid projecting to be distorted from the outside of the outer surface of the vehicle.

Additionally, in the above embodiment, the space 20 is formed between the top end seal portion 16 and the connecting portion 12B. However, instead of this, any arrangement may be adopted in which the top end seal portion 16 is pushed by the upper end edge 14A of the door glass 14 to be rotated about the end portion 12A of the main body of door glass weather strip 12. In consequence, for example, such an arrangement may be adopted that a foam plastic material very high in deformation value and flexible is filled in the portion of the space 20.

In this case, a displacement of the top end seal portion 16 to the outside of the vehicle can be controlled by the foam plastic material filling up the space 20 to position the top end seal portion 16 relative to the upper end edge 14A of the door glass 14, so that the positioning bridge 24 can be dispensed with.

Furthermore, the positioning bridge 24 may be secured to the forward end of the hook-shaped block 17, being connected thereto, for example.

What is claimed is:

1. A door glass weather strip in a motor vehicle comprising a main body of door glass weather strip held by a door frame, a top end seal portion continuously, integrally formed on said main body of door glass weather strip to be clamped between the upper end edge of a door glass and the door frame when said door glass is fully closed and an outer lip formed on said top end seal portion in a manner to be continuously extending to the outside of the vehicle and to come into contact with the outer surface of the upper end edge of said door glass when said door glass is fully closed, wherein:

said top end seal portion and said outer lip are formed to provide a member being of a generally L-shape in cross section, which can integrally rock about the outer end portion of said main body of door glass weather strip on the outer side of the vehicle in a direction of the thickness of said door glass; and a hook-shaped block is formed at the end portion of said top end seal portion on the side of a compartment, to be engaged with a recess formed in said main body of door glass weather strip in a manner to control a displacement of said top end seal portion outwardly in the direction of the thickness of said door glass.

2. A door glass weather strip in a motor vehicle as set forth in claim 1, wherein said top end seal portion is in parallel to a connecting portion extending from the main body of door glass weather strip to the end portion thereof on the outer side of the vehicle along the undersurface of the door frame and opposed to the same in a free condition through a space, and the inner end portion of the top end seal portion on the side of the compartment is connected to the forward end of a positioning bridge, which is projected from the main body of door glass weather strip, whereby outward displacements of the top end seal portion and outer lip can be controlled and be brought into contact with the upper end edge of the door glass at predetermined positions.

3. A door glass weather strip in a motor vehicle as set forth in claim 1, wherein said top end seal portion is in parallel to a connecting portion extending from the main body of door glass weather strip to the end portion thereof on the outer side of the vehicle along the undersurface of the door frame and opposed to the same in a free condition through a space, and a foam plastic material very high in deformation value and flexible is filled in the portion of the space.

4. A door glass weather strip in a motor vehicle as set forth in claim 1, wherein said top end seal portion is in parallel to a connecting portion extending from the main body of door glass weather strip to the end portion thereof on the outer side of the vehicle along the undersurface of the door frame and opposed to the same in a free condition through a space, and the forward end of the hook-shaped block is connected to the forward end of a positioning bridge, which is projected from the main body of door glass weather strip.

5. A door glass weather strip in a motor vehicle as set forth in claim 1, wherein said recess is faced to the hook-shaped block, and the hook-shaped block is formed to be entered the recess when the top end seal portion is pushed up by the upper end edge of the door glass.

6. A door glass weather strip in a motor vehicle as set forth in claim 2, wherein said recess is faced to the hook-shaped block, and the hook-shaped block is formed to be entered the recess when the top end seal portion is pushed up by the upper end edge of the door glass.

7. A door glass weather strip in a motor vehicle as set forth in claim 3, wherein said recess is faced to the hook-shaped block, and the hook-shaped block is formed to be entered the recess when the top end seal portion is pushed up by the upper end edge of the door glass.

8. A door glass weather strip in a motor vehicle as set forth in claim 4, wherein said recess is faced to the hook-shaped block, and the hook-shaped block is formed to be entered the recess when the top end seal portion is pushed up by the upper end edge of the door glass.

9. A door glass weather strip in a motor vehicle as set forth in claim 1, wherein an outer corner portion of the upper end edge of the door glass is chamfered to form a inclined surface directed upwardly and outwardly.

10. A door glass weather strip in a motor vehicle as set forth in claim 2, wherein said outer corner portion of the upper end edge of the door glass is chamfered to form a inclined surface directed upwardly and outwardly.

11. A door glass weather strip in a motor vehicle as set forth in claim 3, wherein said outer corner portion of the upper end edge of the door glass is chamfered to form a inclined surface directed upwardly and outwardly.

12. A door glass weather strip in a motor vehicle as set forth in claim 4, wherein said outer corner portion of the upper end edge of the door glass is chamfered to form a inclined surface directed upwardly and outwardly.

13. A door glass weather strip in a motor vehicle as set forth in claim 5, wherein said outer corner portion of the upper end edge of the door glass is chamfered to form a inclined surface directed upwardly and outwardly.

14. A door glass weather strip in a motor vehicle as set forth in claim 6, wherein said outer corner portion of the upper end edge of the door glass is chamfered to form a inclined surface directed upwardly and outwardly.

* * * * *